US012592512B2

(12) United States Patent
Li et al.

(10) Patent No.: US 12,592,512 B2
(45) Date of Patent: Mar. 31, 2026

(54) ELECTRICAL CONNECTOR WITH WATER-PROOF MEMBER

(71) Applicant: Advanced Connectek Inc., New Taipei City (TW)

(72) Inventors: Yubin Li, New Taipei City (TW); Yao Mei Wang, New Taipei City (TW); Shu-Fen Wang, New Taipei City (TW)

(73) Assignee: Advanced Connectek Inc., New Taipei City (TW)

(*) Notice: Subject to any disclaimer, the term of this patent is extended or adjusted under 35 U.S.C. 154(b) by 404 days.

(21) Appl. No.: 18/187,691

(22) Filed: Mar. 22, 2023

(65) Prior Publication Data

US 2023/0327367 A1 Oct. 12, 2023

(30) Foreign Application Priority Data

Apr. 11, 2022 (CN) ......................... 202210371978.3

(51) Int. Cl.

*H01R 13/52* (2006.01)
*H01R 13/502* (2006.01)
*H01R 24/60* (2011.01)

(52) U.S. Cl.

CPC ......... *H01R 13/521* (2013.01); *H01R 13/502* (2013.01); *H01R 13/5219* (2013.01); *H01R 24/60* (2013.01)

(58) Field of Classification Search

CPC ..... H01R 24/60; H01R 13/521; H01R 13/592
USPC .......................................................... 439/271
See application file for complete search history.

(56) References Cited

U.S. PATENT DOCUMENTS

| | | | | |
|---|---|---|---|---|
| 12,088,032 | B2 * | 9/2024 | Yang | H01R 12/724 |
| 2018/0097298 | A1 * | 4/2018 | Ju | H01R 13/6591 |
| 2021/0006015 | A1 * | 1/2021 | Xu | H01R 13/6596 |
| 2021/0111508 | A1 * | 4/2021 | Gu | H01R 43/005 |
| 2021/0119374 | A1 * | 4/2021 | Wan | H01R 43/18 |
| 2021/0296830 | A1 * | 9/2021 | Su | H01R 24/60 |

* cited by examiner

*Primary Examiner* — Abdullah A Riyami
*Assistant Examiner* — Amara Anderson
(74) *Attorney, Agent, or Firm* — JCIPRNET

(57) ABSTRACT

Disclosed is an electrical connector configured to be mated with another electrical connector along a mating axis. The electrical connector includes an insulating body, a plurality of terminals, a first shell, and a water-proof member. The insulating body includes a first part and a second part separated from each other along the mating axis to form a gap between the first part and the second part along the mating axis. The plurality of terminals are disposed through the insulating body. The first shell is sleeved on the insulating body. The first shell, the first part, and the second part form a closed space at the gap. The water-proof member is disposed at the insulating body and located in the closed space.

12 Claims, 5 Drawing Sheets

ELECTRICAL CONNECTOR WITH WATER-PROOF MEMBER

CROSS-REFERENCE TO RELATED APPLICATION

This application claims the priority benefit of China application no. 202210371978.3, filed on Apr. 11, 2022. The entirety of the above-mentioned patent application is hereby incorporated by reference herein and made a part of this specification.

BACKGROUND

Technical Field

The disclosure relates to an electrical connector.

Description of Related Art

With the continuous advancement of information technology, in order to improve the performance of computers or digital electronic products, expansion of functions may be carried out through externally connected electronic devices of various functions. Typically, an electrical connector is disposed on a computer or an electronic product to achieve connection with an external electronic device.

As a standard input/output interface, the universal serial bus (USB) interface has been widely applied to many electronic products to realize mutual transmission of signals. Due to different usage environments of the products, different products have different requirements, such as water-proof and dust-proof among other special requirements, for performance of the electrical connector. In addition, as the electrical connector trends toward miniaturization, this property increases requirements for structural strength and stability of the electrical connector.

SUMMARY

The disclosure provides an electrical connector, in which a corresponding water-proof mechanism is provided from the internal structure, and particularly provided between an insulating body and a terminal, of the electrical connector.

According to an embodiment of the disclosure, an electrical connector is configured to be mated with another electrical connector along a mating axis. The electrical connector includes an insulating body, a plurality of terminals, a first shell, and a water-proof member. The insulating body includes a first part and a second part separated from each other along the mating axis to form a gap between the first part and the second part along the mating axis. The plurality of terminals are disposed through the insulating body. The first shell is sleeved on the insulating body. The first shell, the first part, and the second part form a closed space at the gap. The water-proof member is disposed at the insulating body and located in the closed space.

In an embodiment of the disclosure, the water-proof member is liquid silicone rubber injection molding, and structural interference is generated during assembly of the water-proof member and the first shell.

In an embodiment of the disclosure, the plurality of terminals are disposed through the first part and the second part and connect the first part and the second part separated from each other.

In an embodiment of the disclosure, a portion of the plurality of terminals is exposed from the gap, and the water-proof member is filled in the gap to cover the portion of the plurality of terminals being exposed.

In an embodiment of the disclosure, the first part includes a first base part and a tongue part. The first base part is assembled in the first shell. The tongue part extends out of the first shell from the first base part along the mating axis away from the second part. A portion of each of the terminals is exposed from the tongue part.

In an embodiment of the disclosure, the electrical connector further includes a metallic piece disposed in the insulating body and separating the plurality of terminals into two terminal sets. A portion of one of the terminal sets is exposed from an upper surface of the tongue part, and a portion of the other one of the terminal sets is exposed from a lower surface of the tongue part.

In an embodiment of the disclosure, the second part includes a second base part and a tail part. The second base part is assembled in the first shell. The tail part extends out of the first shell from the second base part along the mating axis away from the first part. A portion of each of the terminals extends out of the tail part.

In an embodiment of the disclosure, the electrical connector further includes a metallic piece disposed in the insulating body and separating the plurality of terminals into two terminal sets. A portion of the metallic piece, a portion of one of the terminal sets, and a portion of the other one of the terminal sets each protrude from the tail part and are located on the same plane.

In an embodiment of the disclosure, the portion of the metallic piece and the portion of one of the terminal sets are at a same distance to the second base part, and the portion of the other one of the terminal sets is at another distance less than the distance to the second base part.

In an embodiment of the disclosure, the electrical connector further includes a second shell assembled to and covering the tail part.

In an embodiment of the disclosure, the first shell includes a main body and a sleeve. The main body is sleeved on the insulating body and interferes with the water-proof member. The sleeve is sleeved on the main body at a mating opening of the main body.

In an embodiment of the disclosure, the electrical connector further includes another water-proof member disposed between the sleeve and the main body.

Based on the foregoing, in the electrical connector according to the embodiments of the disclosure, the closed space is formed by sleeving the first shell on the insulating body, and the water-proof member is disposed at the insulating body, so that the insulating body is located in the closed space when the first shell and the insulating body are assembled with each other. Accordingly, the water-proof member forms a water-proof structure between the shell and the insulating body. In this way, not only the corresponding water-proof mechanism is provided for the shell and the insulating body, but the water-proof mechanism also achieves an effective separation even if a gap exists between the terminals and the insulating body. In other words, a complete water-proof mechanism can be provided from the internal structure of the electrical connector.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
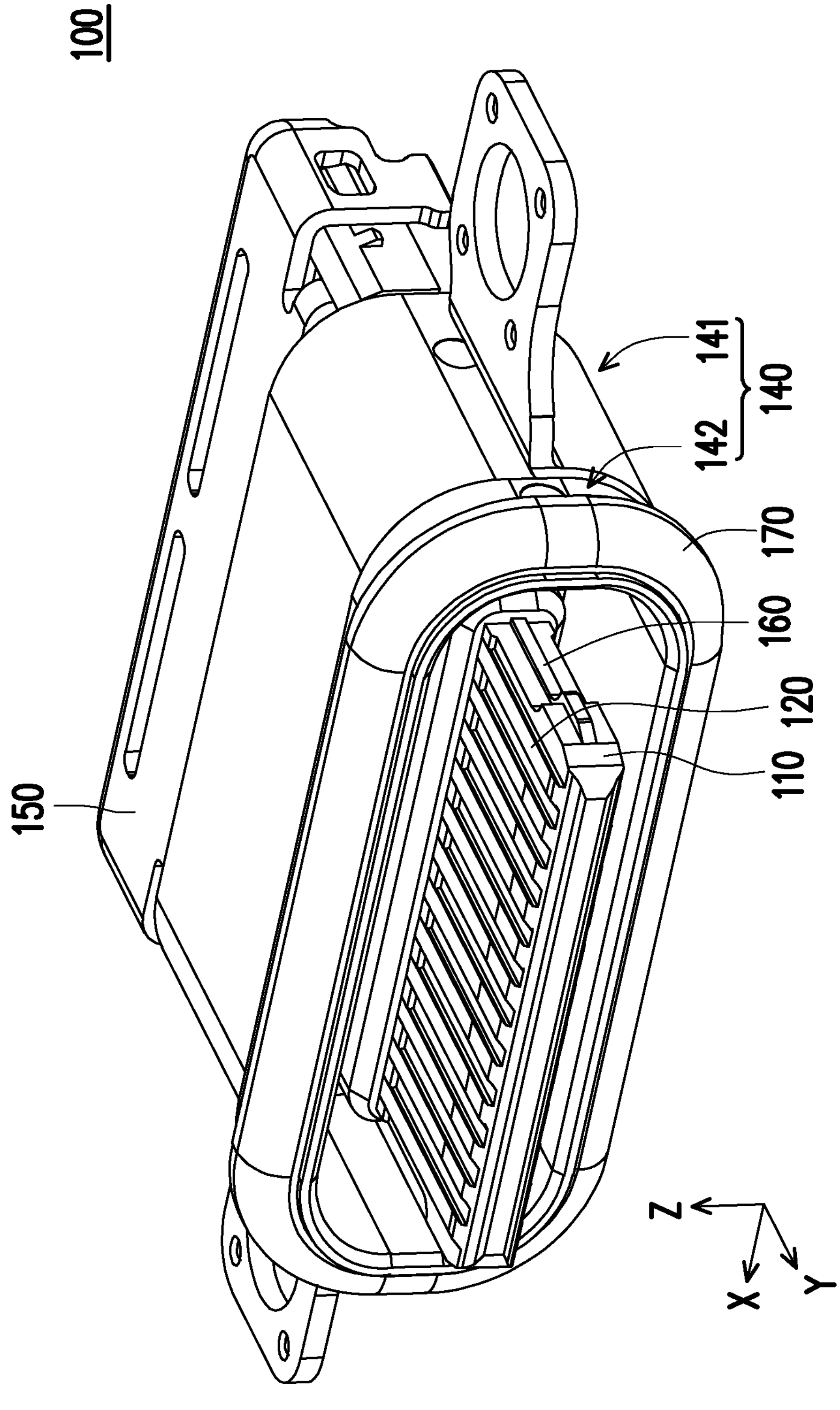
FIG. 1 is a schematic view of an electrical connector according to an embodiment of the disclosure.
Figure 2:
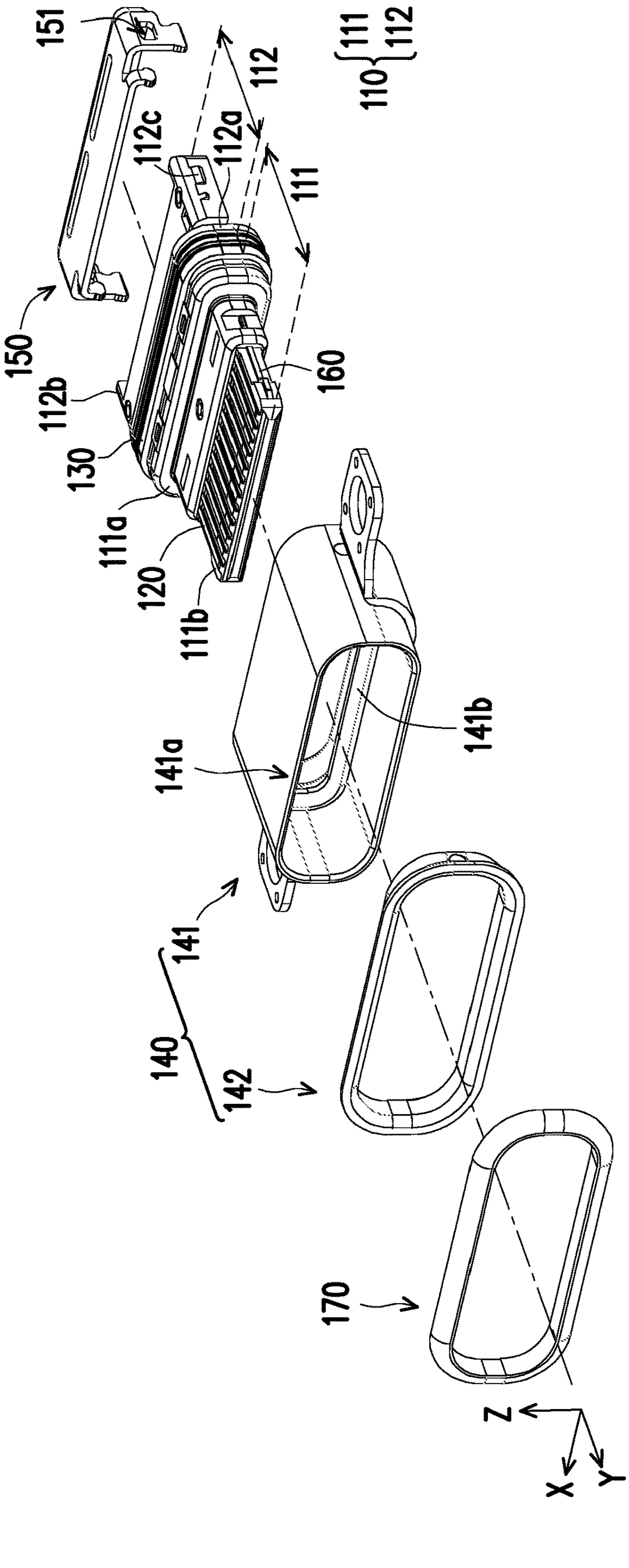
FIG. 2 is a schematic exploded view of the electrical connector of FIG. 1.
Figure 3:
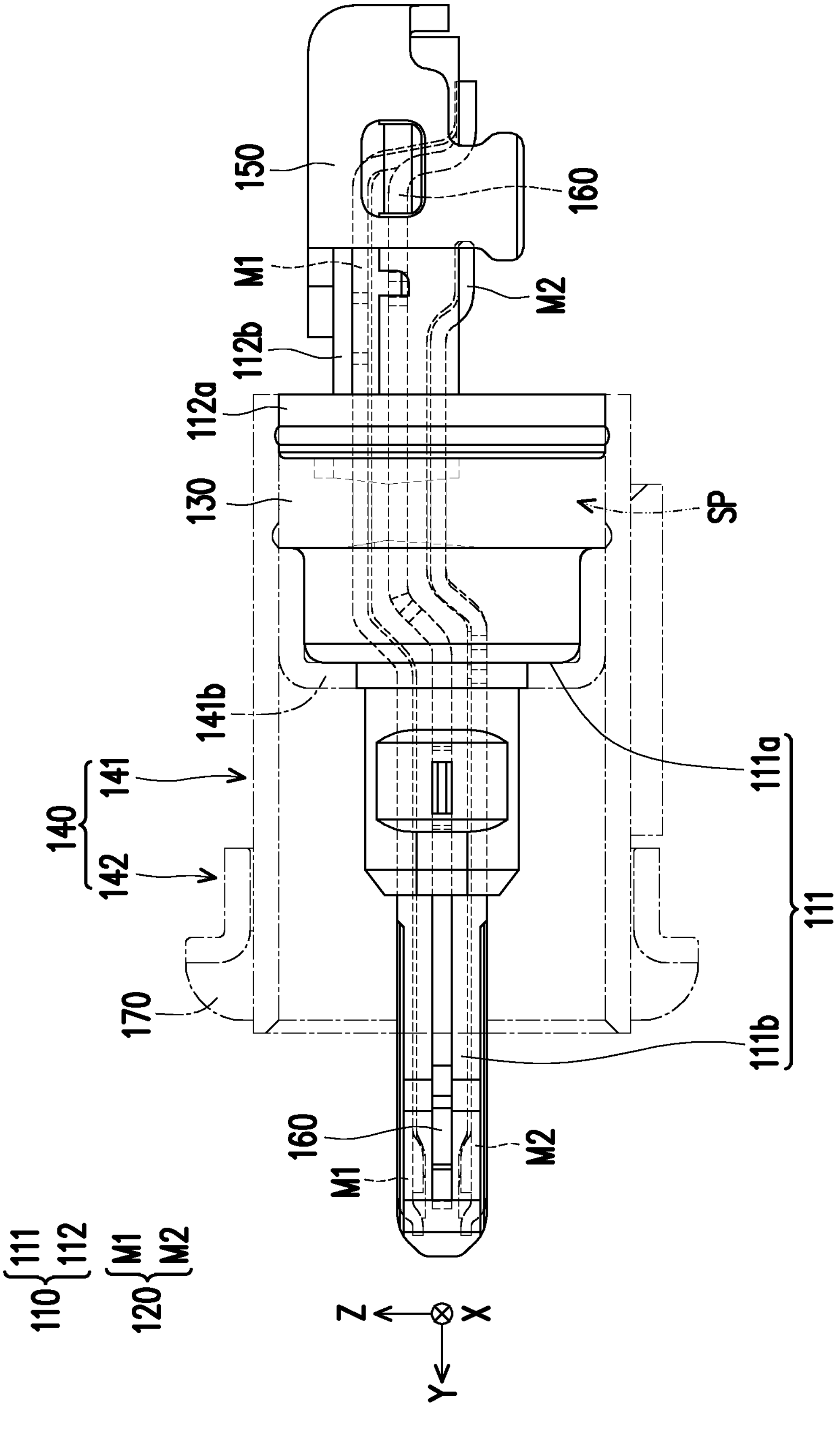
FIG. 3 is a side view of the electrical connector of FIG. 1.

FIG. 1 is a schematic view of an electrical connector according to an embodiment of the disclosure. FIG. 2 is a schematic exploded view of the electrical connector of FIG. 1. FIG. 3 is a side view of the electrical connector of FIG. 1. In order to facilitate identification, some components shown in FIG. 3 are drawn with broken lines. A Cartesian coordinate system X-Y-Z is also provided here to facilitate description of components. With reference to FIG. 1 to FIG. 3 together, in this embodiment, an electrical connector 100 includes an insulating body 110, a plurality of terminals 120, a first shell 140, and a water-proof member 130. The terminals 120 are disposed through the insulating body 110. The first shell 140 is sleeved on the insulating body 110, and the first shell 140 and the insulating body 110 form a closed space SP. The water-proof member 130 is disposed at the insulating body 110 and located in the closed space SP. In this embodiment, the electrical connector 100 is adapted to be mated with another electrical connector (not shown) along the Y-axis. In other words, the Y-axis shown in the figures of the disclosure is regarded as a mating axis of the electrical connector 100 (with another electrical connector).

Further, the insulating body 110 of this embodiment includes a first part 111 and a second part 112 disposed along the mating axis and separated from each other. The first part 111, the second part 112, and the first shell 140 form the closed space SP. The terminals 120 are combined with the insulating body 110 through insert molding, and also are disposed through the first part 111 and the second part 112 and connect the first part 111 and the second part 112. As shown in FIG. 2, the first shell 140 includes a main body 141 and a sleeve 142. The main body 141 is sleeved on the insulating body 110 and interferes with the water-proof member 130. The sleeve 142 is sleeved on the main body 141 at a mating opening 141*a* of the main body 141, and the sleeve 142 is combined with the main body 141 by welding, for example. The mating opening 141*a* shown here is also a place where the electrical connector 100 is mated with another electrical connector.

Figure 4:
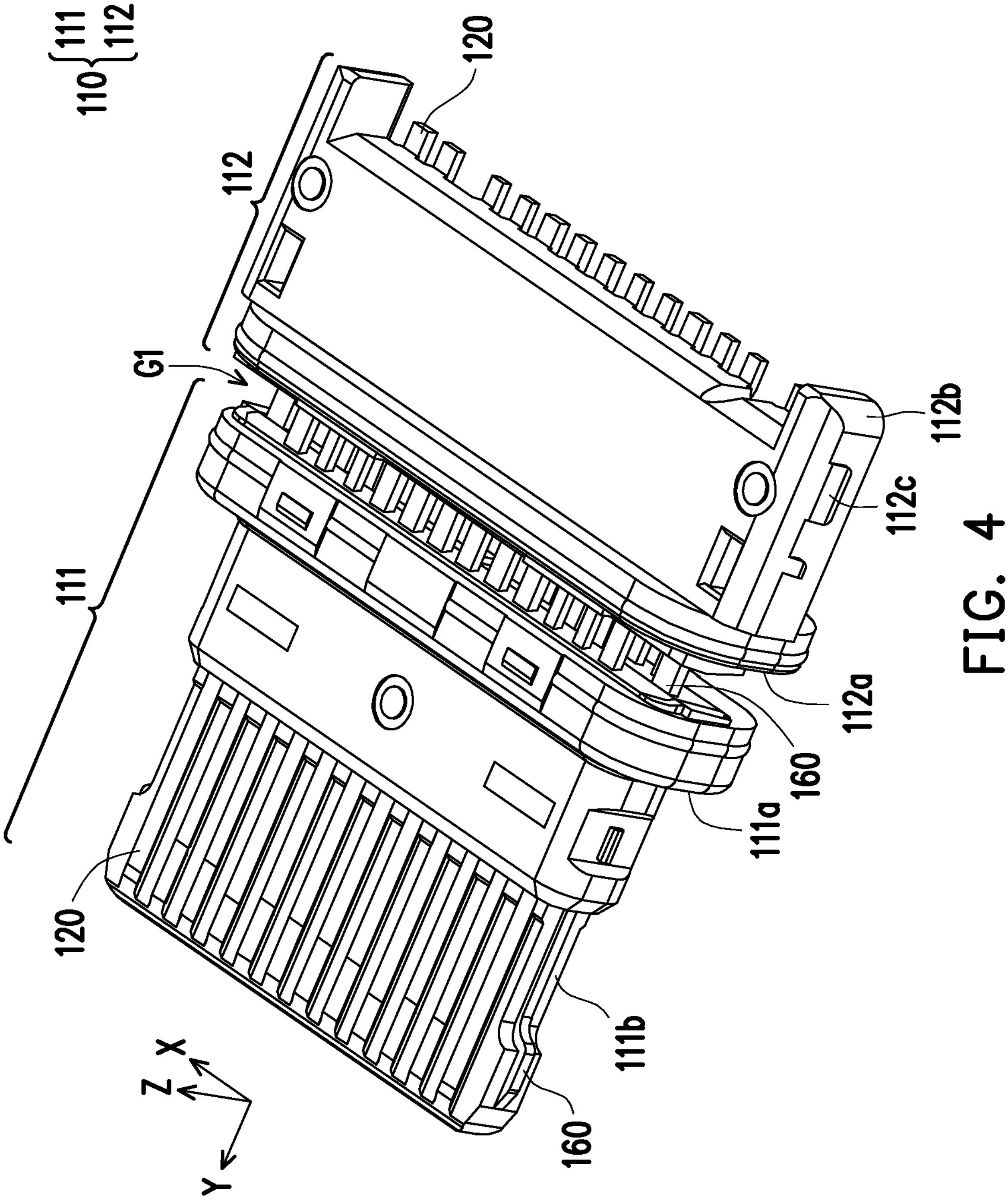
FIG. 4 and FIG. 5 respectively show a semi-product of an electrical connector from different perspectives.
Figure 5:
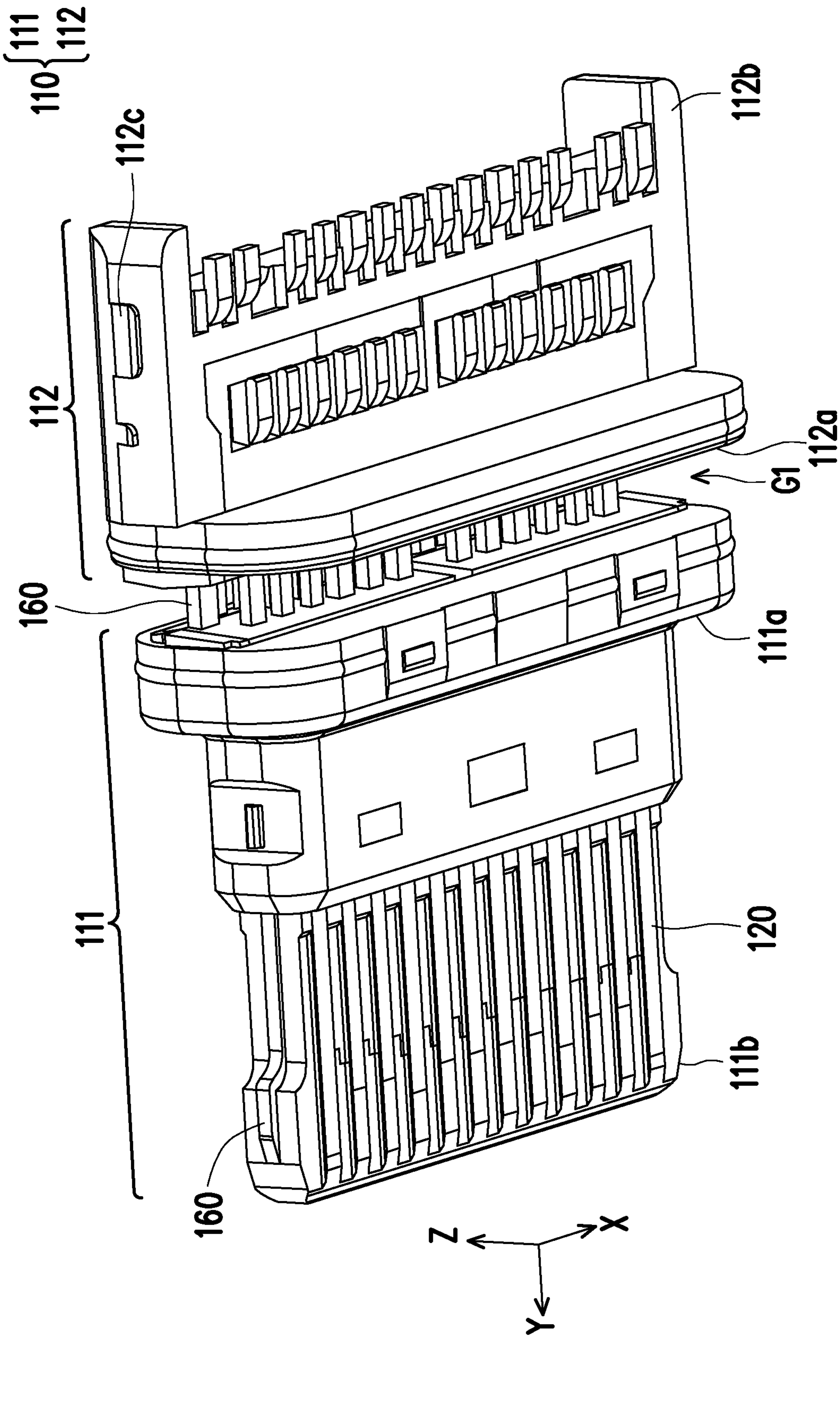

FIG. 4 and FIG. 5 respectively show a semi-product of an electrical connector from different perspectives. With reference to FIG. 3 to FIG. 5 together, in this embodiment, a gap G1 is formed between the first part 111 and the second part 112 along the mating axis. A portion of the terminals 120 is exposed from the gap G1. The water-proof member 130 is filled in the gap G1 to cover the portion of the terminals 120 being exposed.

Moreover, the water-proof member 130 is liquid silicone rubber injection molding (LIM). The water-proof member 130 is formed after curing of liquid silicone that is injected in the gap G1 between the first part 111 and the second part 112 following the combination of the insulating body 110 and the terminals 120 by insert molding, namely the completed state of the insulating body 110, the terminals 120, and the water-proof member 130 shown in FIG. 2. Then, the insulating body 110, the terminals 120, and the water-proof member 130 are assembled with the first shell 140 and a second shell 150.

Meanwhile, due to the material properties of the water-proof member 130, structural interference may be generated during assembly of the water-proof member 130 of this embodiment and the first shell 140, as shown in FIG. 3. As such, the water-proof member 130 can be tightly pressed against the inner wall of the first shell 140 to accordingly prevent moisture, foreign objects, dust, or the like from passing through the internal space of the first shell 140. The electrical connector 100 of this embodiment is essentially a receptacle electrical connector typically adapted to be disposed in an electronic device (not shown). Therefore, the water-proof member 130 can effectively prevent foreign objects from entering the electronic device through the electrical connector 100.

The first part 111 of this embodiment includes a first base part 111*a* and a tongue part 111*b*. The first base part 111*a* is assembled in the first shell 140 and substantially abuts a stopper 141*b* in the first shell 140. The tongue part 111*b* extends out of the first shell 140 from the first base part 111*a* along the mating axis away from the second part 112. A portion of each terminal 120 is exposed from the tongue part 111*b*. Comparatively, the second part 112 includes a second base part 112*a* and a tail part 112*b*. The second base part 112*a* is assembled in the first shell 140. The tail part 112*b* extends out of the first shell 140 from the second base part 112*a* along the mating axis away from the first part 111. A portion of each terminal 120 extends out of the tail part 112*b*. Here, the tail part 112*b* and the portion of the terminals 120 extending therefrom are configured to be soldered on a circuit board (not shown) of the electronic device. Furthermore, the electrical connector 100 of this embodiment further includes the second shell 150 assembled to and covering the tail part 112*b*. The second shell 150 is assembled, for example, by buckling a buckle hole 151 at a buckle protrusion 112*c* of the second part 112. Meanwhile, the second shell 150 further has pins located below the buckle hole 151 and configured to be inserted to the circuit board.

In addition, the electrical connector 100 further includes a metallic piece 160 disposed in the insulating body 110 and separates the plurality of terminals 120 into two terminal sets M1 and M2. The metallic piece 160 is also a shielding piece. With reference to FIG. 3, a portion of the metallic piece 160, a portion of the terminal set M1, and a portion of the terminal set M2 each protrude from the tail part 112*b* and are located on the same plane to accordingly be smoothly welded to a plurality of pads (not shown) on the circuit board. Meanwhile, different from the configuration of the terminals 120 at the tongue part 111*b* where the terminal sets M1 and M2 are respectively exposed from an upper surface and a lower surface of the tongue part 111*b*, at the tail part 112*b*, (the portion protruding from the tail part 112*b*) of the terminal set M1 and (the portion protruding from the tail part 112*b*) of the metallic piece 160 are at a same distance to the second base part 112*a*, and the portion of the terminal set M2 protruding from the tail part 112*b* is at another distance less than the distance to the second base part 112*a*. in other words, the terminals 120 and the metallic piece 160 are in a front-rear arrangement along the Y axis at the tail part 112*b*. The portion of the terminal set M2 protruding from the tail part 112*b* is close to the second base part 112*a*, while the portion of the terminal set M1 and the portion of the metallic piece 160 protruding from the second base part 112*a* are away from the second base part 112*a*.

With reference to FIG. 2 and FIG. 3 again, the electrical connector 100 of this embodiment further includes another water-proof member 170. The water-proof member 170 is made of silicone material, for example. The water-proof member 170 is disposed between the main body 141 and the sleeve 142 of the first shell 140, and is disposed along the mating opening 141*a* to form a closed outline. When the electrical connector 100 is assembled as a receptacle electrical connector in the electronic device, the water-proof member 170 is configured to interfere with the structure of the electronic device to achieve the water-proof and dust-proof requirements.

In summary of the foregoing, in the electrical connector according to the embodiments of the disclosure, the closed space is formed by sleeving the first shell on the insulating body, and the water-proof member is disposed at the insulating body, so that the insulating body is located in the closed space when the first shell and the insulating body are assembled with each other. Further, after the terminals and the insulating body are combined, the first part and the second part of the insulating body are separated from each other along the mating axis and form a gap. A portion of the terminals and a portion of the metallic piece may be exposed from the gap. Then, after curing and molding of liquid silicone that is injected in the gap, the water-proof member connecting the first part and the second part and also covering the terminals and the metallic piece is formed. Lastly, the water-proof member is assembled with the first shell to generate structural interference by the water-proof member and the inner wall of the first shell and ensure the sealing.

Accordingly, the water-proof member forms a water-proof structure between the shell and the insulating body. In this way, not only the corresponding water-proof mechanism is provided for the shell and the insulating body, but the water-proof mechanism also achieves an effective separation even if a gap exists between the terminals and the insulating body. In other words, a complete water-proof mechanism can be provided from the internal structure of the electrical connector.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electrical connector configured to be mated with another electrical connector along a mating axis, the electrical connector comprising:

an insulating body comprising a first part and a second part separated from each other along the mating axis to form a gap between the first part and the second part along the mating axis;

a plurality of terminals disposed through the insulating body;

a first shell sleeved on the insulating body, the first shell, the first part, and the second part forming a closed space at the gap; and a water-proof member disposed at the insulating body and located in the closed space.

2. The electrical connector of claim 1, wherein the water-proof member is liquid silicone rubber injection molding, and structural interference is generated during assembly of the water-proof member and the first shell.

3. The electrical connector of claim 1, wherein the plurality of terminals are disposed through the first part and the second part and connect the first part and the second part separated from each other.

4. The electrical connector of claim 1, wherein a portion of the plurality of terminals is exposed from the gap, and the water-proof member is filled in the gap to cover the portion of the plurality of terminals being exposed.

5. The electrical connector of claim 1, wherein the first part comprises a first base part and a tongue part, the first base part is assembled in the first shell, the tongue part extends out of the first shell from the first base part along the mating axis away from the second part, and a portion of each of the terminals is exposed from the tongue part.

6. The electrical connector of claim 5, further comprising a metallic piece disposed in the insulating body and separating the plurality of terminals into two terminal sets, a portion of one of the terminal sets is exposed from an upper surface of the tongue part, and a portion of the other one of the terminal sets is exposed from a lower surface of the tongue part.

7. The electrical connector of claim 1, wherein the second part comprises a second base part and a tail part, the second base part is assembled in the first shell, the tail part extends out of the first shell from the second base part along the mating axis away from the first part, and a portion of each of the terminals extends out of the tail part.

8. The electrical connector of claim 7, further comprising a metallic piece disposed in the insulating body and separating the plurality of terminals into two terminal sets, a portion of the metallic piece, a portion of one of the terminal sets, and a portion of the other one of the terminal sets each protrude from the tail part and are located on a same plane.

9. The electrical connector of claim 8, wherein the portion of the metallic piece and the portion of one of the terminal sets are at a same distance to the second base part, and the portion of the other one of the terminal sets is at another distance less than the distance to the second base part.

10. The electrical connector of claim 7, further comprising a second shell assembled to and covering the tail part.

11. The electrical connector of claim 1, wherein the first shell comprises a main body and a sleeve, the main body is sleeved on the insulating body and interferes with the water-proof member, and the sleeve is sleeved on the main body at a mating opening of the main body.

12. The electrical connector of claim 11, further comprising another water-proof member disposed between the sleeve and the main body.

* * * * *